US009215256B2

(12) United States Patent
Suryavanshi

(10) Patent No.: US 9,215,256 B2
(45) Date of Patent: Dec. 15, 2015

(54) UPDATING CONTACT INFORMATION FOR CLIENT DEVICES REGISTERED TO THE SAME USER FOR AN INTERNET PROTOCOL MULTIMEDIA SUBSYSTEM SERVICE

(71) Applicant: QUALCOMM Incorporated, San Diego, CA (US)

(72) Inventor: Vijay A. Suryavanshi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 202 days.

(21) Appl. No.: 13/972,811

(22) Filed: Aug. 21, 2013

(65) Prior Publication Data

US 2015/0055653 A1  Feb. 26, 2015

(51) Int. Cl.
H04L 29/06 (2006.01)
(52) U.S. Cl.
CPC ........ *H04L 65/1073* (2013.01); *H04L 65/1006* (2013.01); *H04L 65/1016* (2013.01)
(58) Field of Classification Search
None
See application file for complete search history.

(56) References Cited

U.S. PATENT DOCUMENTS

| 8,028,074 | B2 | 9/2011 | Allen |
| 8,265,622 | B2 | 9/2012 | Zhu |
| 2004/0176091 | A1* | 9/2004 | Bajko et al. ................. 455/435.1 |
| 2010/0091671 | A1* | 4/2010 | Lidstrom et al. ............... 370/252 |
| 2011/0194554 | A1* | 8/2011 | Gavita et al. .................. 370/352 |
| 2011/0197058 | A1 | 8/2011 | Mayer et al. |
| 2011/0238845 | A1 | 9/2011 | Keller et al. |

FOREIGN PATENT DOCUMENTS

| CN | 101697619 A | 4/2010 | |
| EP | 1809001 A1 | 7/2007 | |
| EP | 2093968 A1 * | 8/2009 | .............. H04L 29/06 |
| EP | 2093968 B1 | 4/2010 | |

OTHER PUBLICATIONS

"RCS-e Advanced Communications Services and Client Specification", Apr. 8, 2011, pp. 1-151, XP002685665, Retrieved from the Internet: URL:http:l/www.gsma.com/rcslwp-content/uploads/2012/03/rcsespecv11final.zip.*
International Search Report and Written Opinion—PCT/US2014/051867—ISA/EPO—Oct. 30, 2014.

* cited by examiner

*Primary Examiner* — Huy D Vu
*Assistant Examiner* — James P Duffy
(74) *Attorney, Agent, or Firm* — Muncy, Geissler, Olds & Lowe, P.C.

(57) ABSTRACT

In an embodiment, a single registrar component of an Internet Protocol (IP) Multimedia Subsystem (IMS) network, receives a request to register a client device associated with a user to an IMS service. The single registrar component sends an acknowledgment to the request that indicates an assignment of device-specific routing identifier(s) (e.g., GRUUs) for the client device. The acknowledgment is further configured to include an indication other device-specific routing identifier(s) for other client device(s) that have already registered to the IMS service in association with the same user.

22 Claims, 14 Drawing Sheets

UPDATING CONTACT INFORMATION FOR CLIENT DEVICES REGISTERED TO THE SAME USER FOR AN INTERNET PROTOCOL MULTIMEDIA SUBSYSTEM SERVICE

BACKGROUND OF THE INVENTION

1. Field of the Invention

Embodiments of the invention relate to updating contact information for client devices registered to the same user for an Internet Protocol (IP) Multimedia Subsystem (IMS) service.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

Access networks using various communication protocols (e.g., 3GPP access networks such as W-CDMA, LTE, etc., or non-3GPP access networks such as WiFi, WLAN or wired LAN, etc.) can be configured to provide Internet Protocol (IP) Multimedia Subsystem (IMS) services via an LMS network managed by an operator (e.g., Verizon, Sprint, AT&T, etc.) to users across a communications system. Users that access the IMS network to request an IMS service are assigned to one of a plurality of regional application servers or application server clusters (e.g., groups of application servers that serve the same cluster region) for supporting the requested IMS service.

Rich Communications Suite (RCS) is a recently developed service-type in the IMS domain. RCS permits users to query device capabilities and/or application-level multimedia capabilities from their contacts, such that a client device can update the capabilities of the contacts in its address book in real-time and thus enable "rich communication", such as Voice over LTE (VoLTE), video calls, Instant Messaging (IM), file or image sharing, etc., based on the real-time capabilities of the contacts. In the current RCS standard, user equipments (UEs) (or client devices) send a UE-to-UE (or peer-to-peer) Session Initiation Protocol (SIP) OPTIONS message to one or more target UEs to request the UE-specific RCS capabilities of the target UEs. The SIP OPTIONS message includes the RCS capabilities of the transmitting UE, and the SIP OPTIONS message prompts the target UE to respond to the SIP OPTIONS message with a SIP 200 OK message that indicates the RCS capabilities of the target UE. Thus, the exchange of the SIP OPTIONS and SIP 200 OK messages is a peer-to-peer handshaking process that is mediated by the IMS network and by which both endpoints update their respective RCS capabilities for the other endpoint.

For example, UE 1 can send a SIP OPTIONS message to UE 2 over an IMS network that indicates UE 1's RCS capabilities and requests UE 2 to respond back to UE 1 with an indication of the RCS capabilities of UE 2, UE 1 can send a SIP OPTIONS message to UE 3 over the IMS network that indicates UE 1's RCS capabilities and requests UE 3 to respond back to UE 1 with an indication of the RCS capabilities of UE 3, and so on. UE 2 then responds to the SIP OPTIONS message from UE 1 with a SIP 200 OK message that indicates UE 2's RCS capabilities, UE 3 responds to the SIP OPTIONS message from UE 1 with a SIP 200 OK message that indicates UE 3's RCS capabilities, and so on.

In the current IMS standard, different UEs (e.g., a cell phone, a tablet computer, a desktop computer, etc.) can be registered to the same user for IMS service. However, in the current IMS standard, a UE that is registered to the same user as another UE does not necessarily have contact information for uniquely addressing the other UE.

SUMMARY

In an embodiment, a single registrar component of an Internet Protocol (IP) Multimedia Subsystem (IMS) network, receives a request to register a client device associated with a user to an IMS service. The single registrar component sends an acknowledgment to the request that indicates an assignment of device-specific routing identifier(s) (e.g., GRUUs) for the client device. The acknowledgment is further configured to include an indication other device-specific routing identifier(s) for other client device(s) that have already registered to the IMS service in association with the same user.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
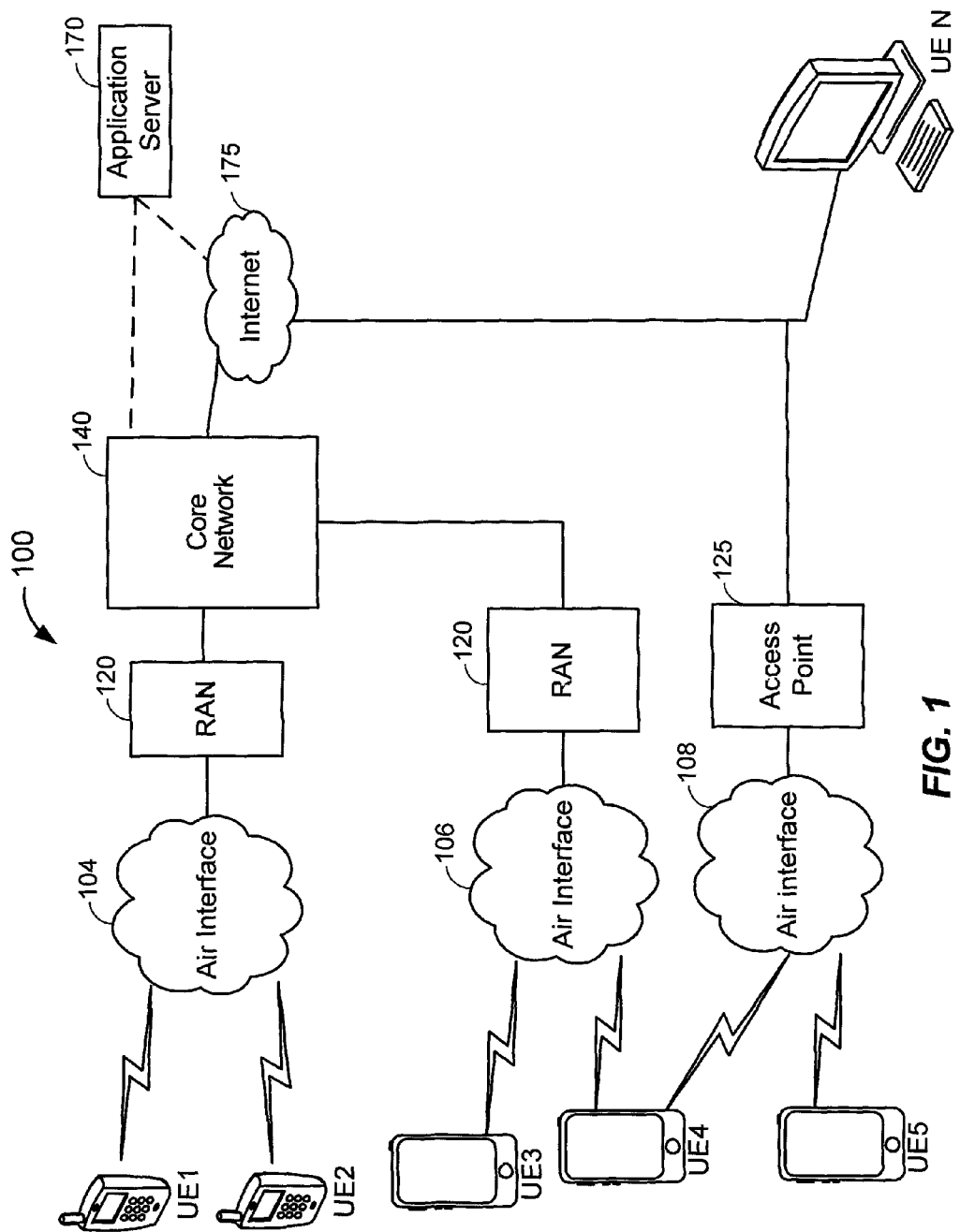
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link, through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 ... N. The UEs 1 ... N can include cellular telephones, personal digital assistant (PDAs), pagers, a laptop computer, a desktop computer, and so on. For example, in FIG. 1, UEs 1 ... 2 are illustrated as cellular calling phones, UEs 3 ... 5 are illustrated as cellular touch-screen phones or smart phones, and UE N is illustrated as a desktop computer or PC.

Referring to FIG. 1, UEs 1 ... N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an. Ethernet connection of WiFi or 802.11-based network). The Internet 175 can thereby function to bridge packet-switched data communications between UE N and UEs 1 ... N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
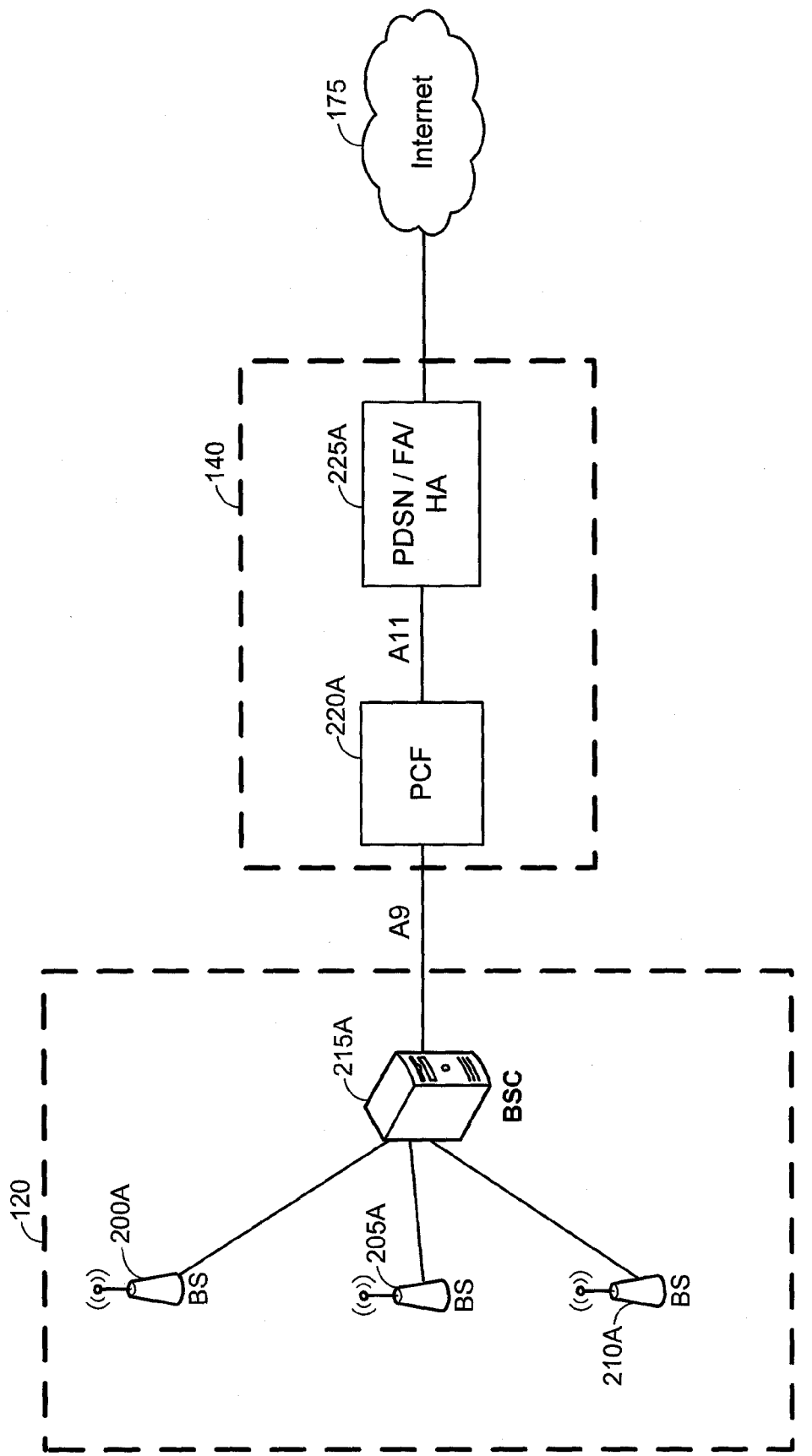
FIG. 2A illustrates an example configuration of a radio access network (RAN) and a packet-switched portion of a core network for a 1×EV-DO network in accordance with an embodiment of the invention.

FIG. 2A illustrates an example configuration of the RAN 120 and the core network 140 for packet-switched communications in a CDMA2000 1× Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220\ performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
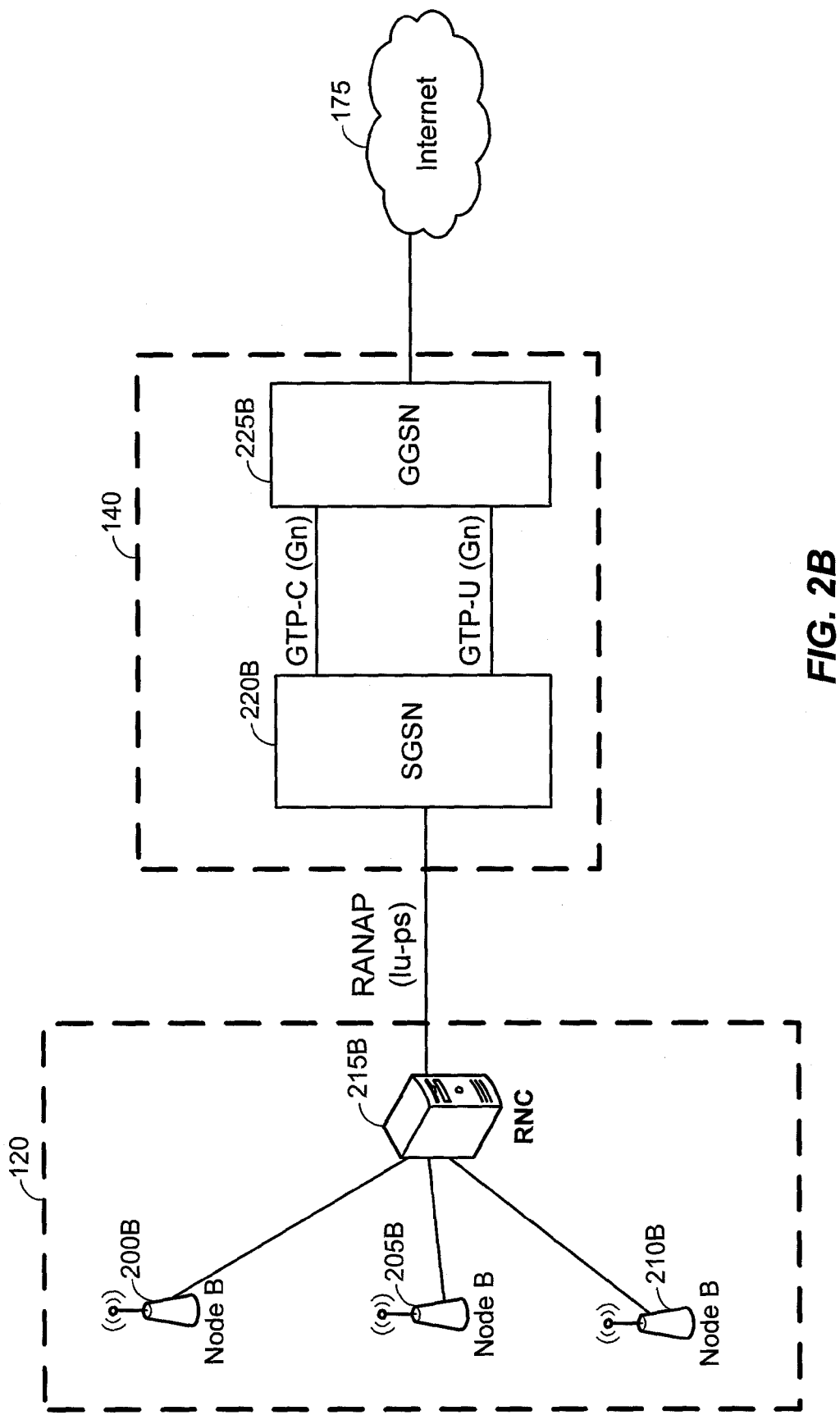
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1×EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 2259 and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDF) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
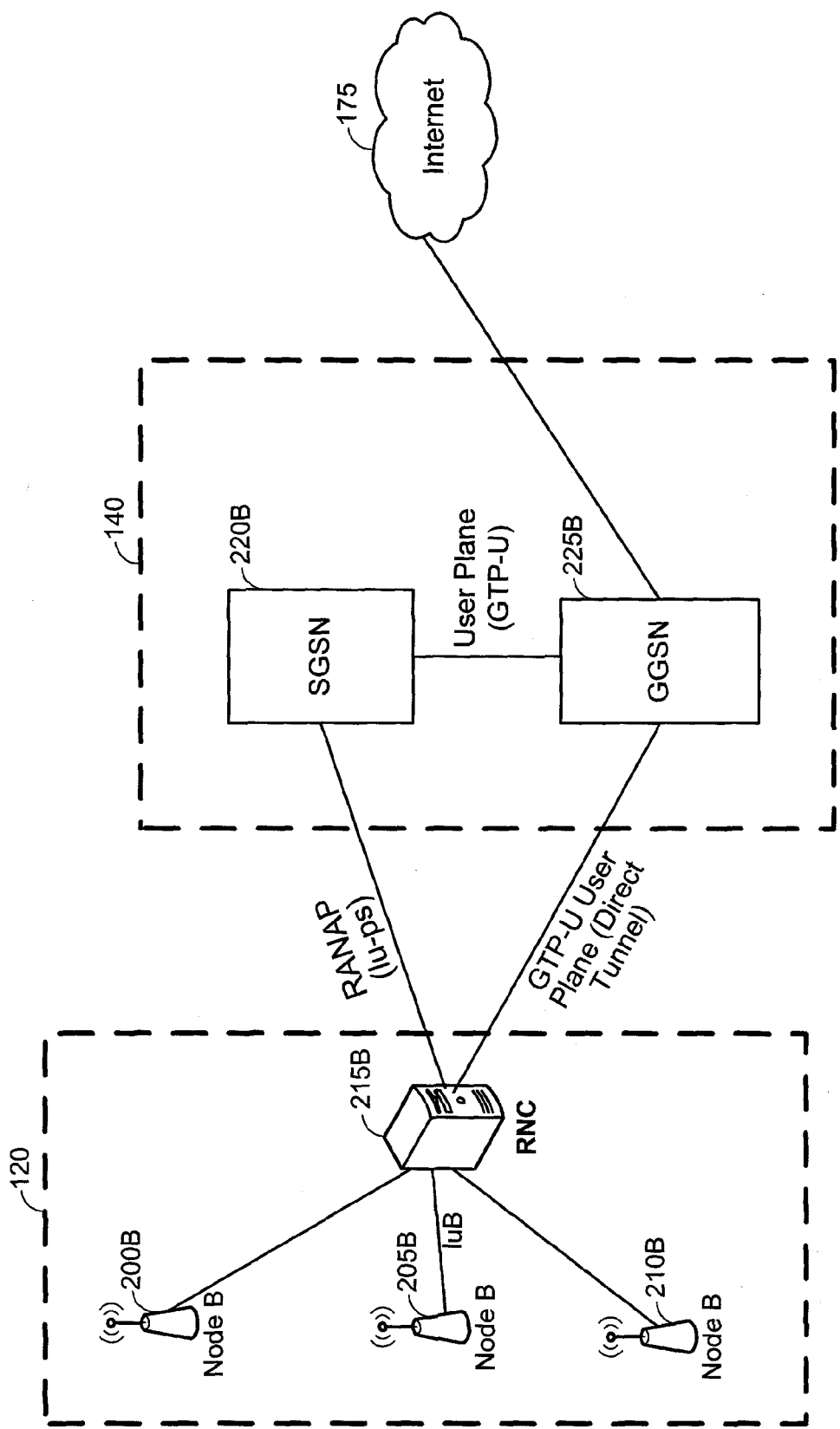
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
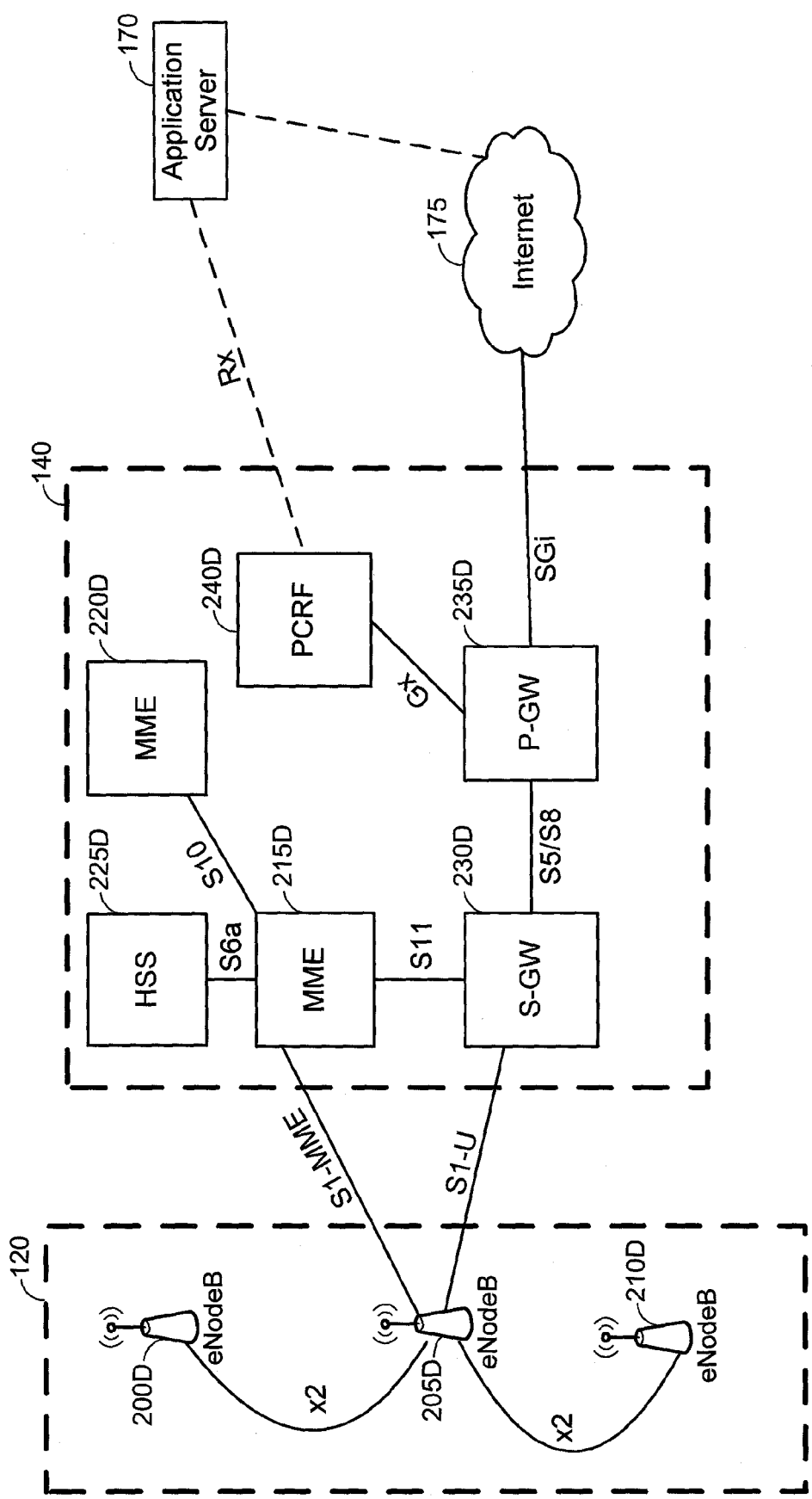
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node 13s (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
| --- | --- |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security. Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Ox interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
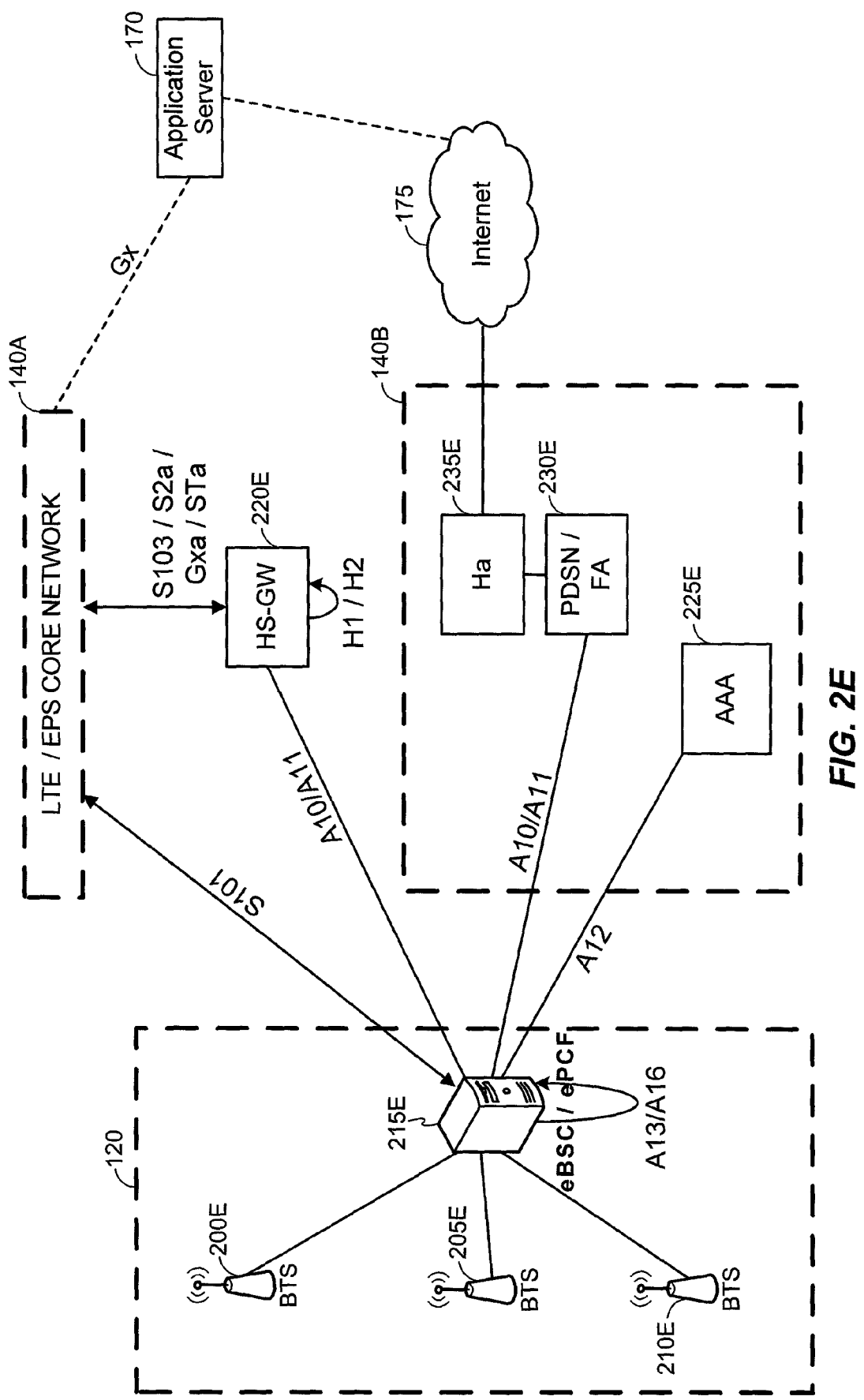
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
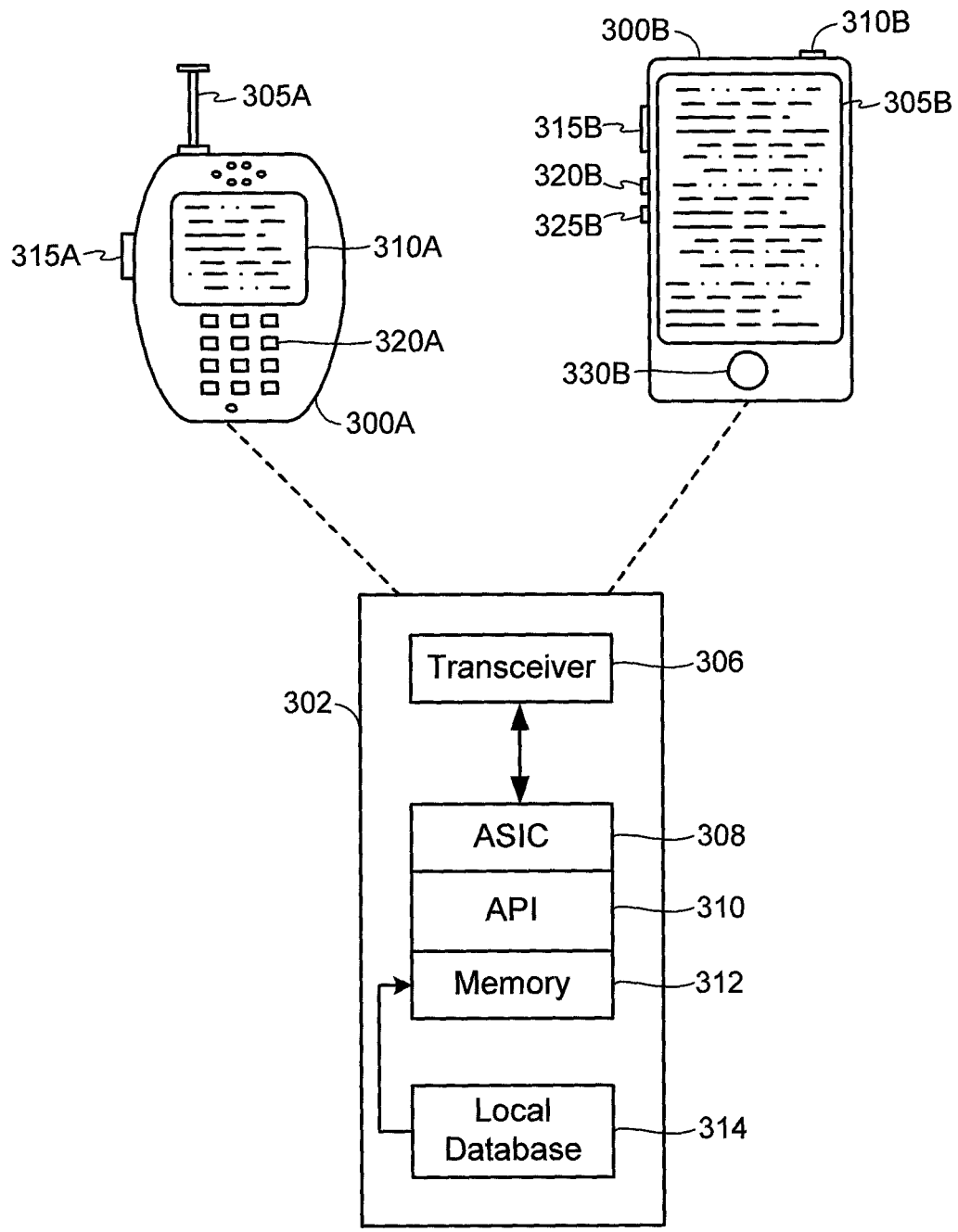
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
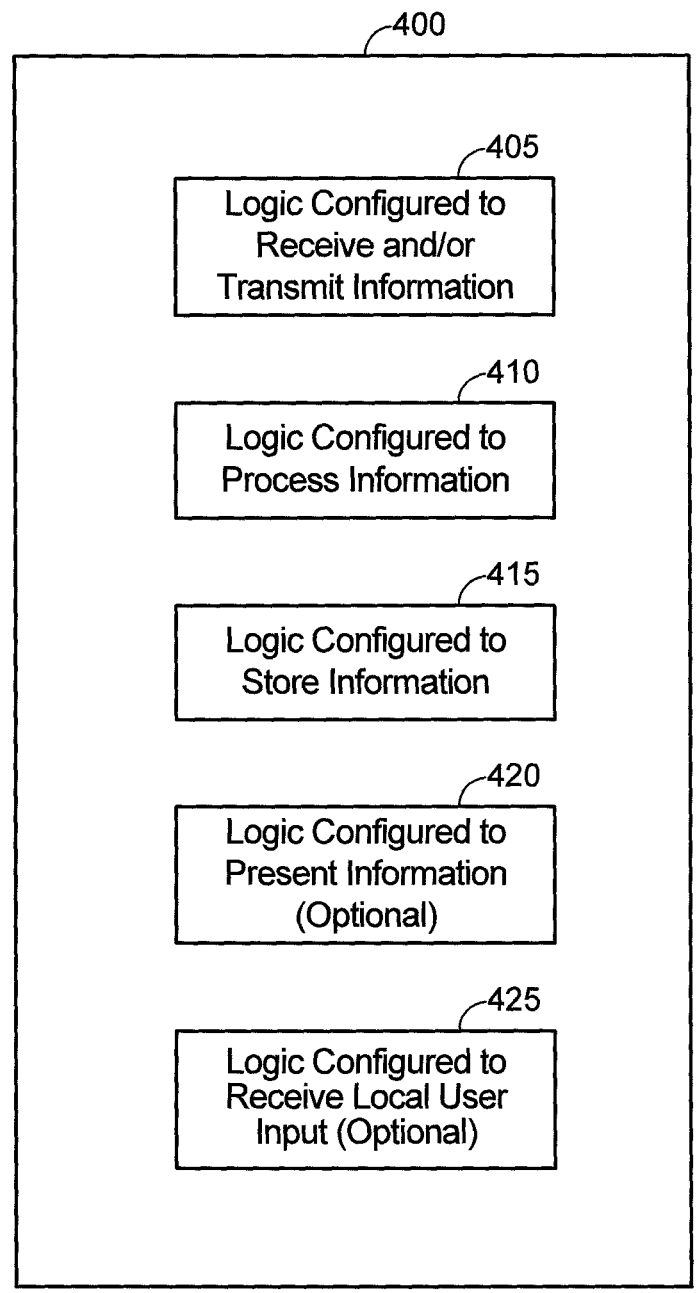
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
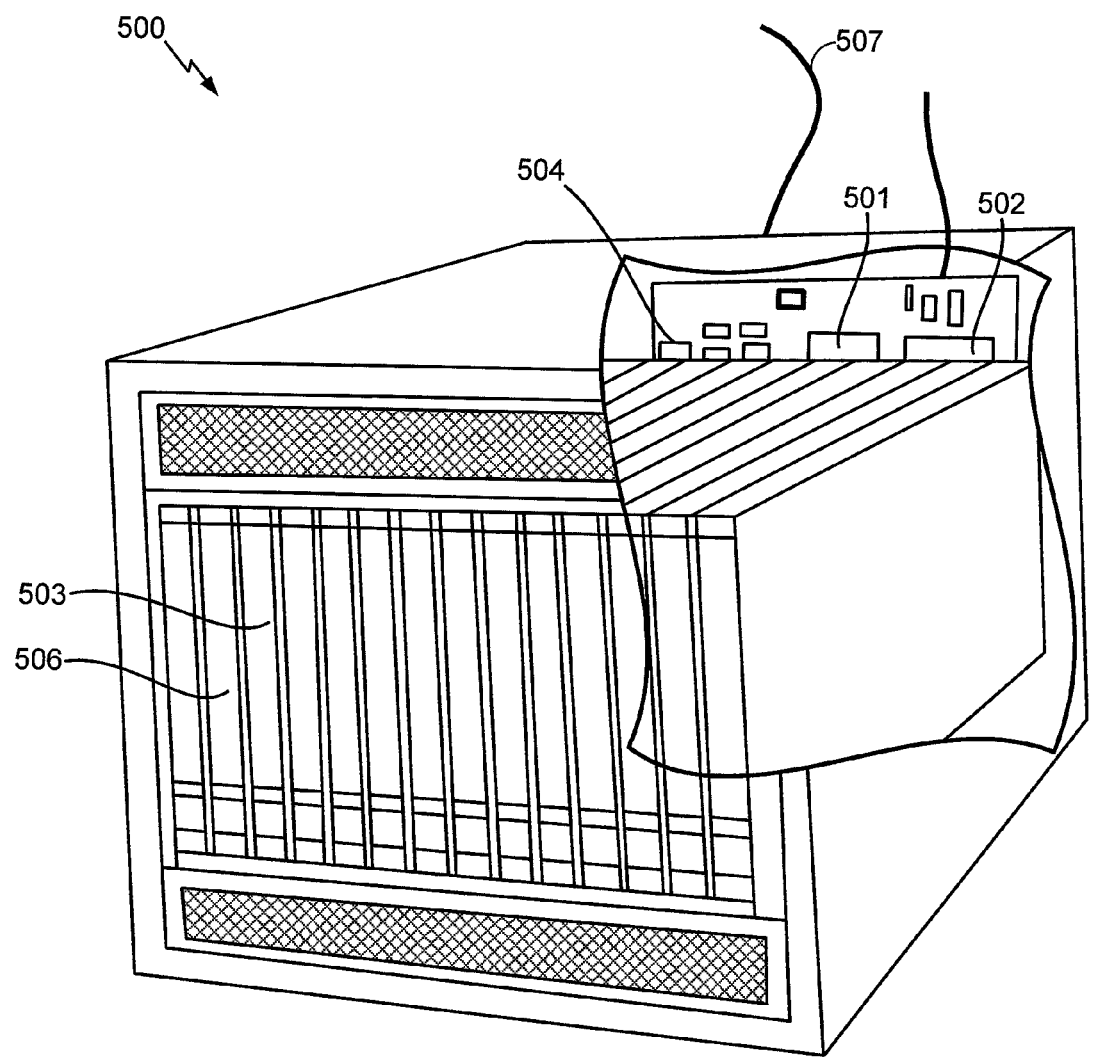
FIG. 5 illustrates a server in accordance with an embodiment of the invention.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 500 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access ports 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

Access networks using various communication protocols (e.g., 3GPP access networks such as W-CDMA, LTE, etc. as described above with respect to FIGS. 2A-2E, or non-3GPP access networks such as WiFi, WLAN or wired LAN, IEEE 802, IEEE 802.11, etc.) can be configured to provide Internet Protocol (IP) Multimedia Subsystem (IMS) services via an IMS network managed by an operator (e.g., Verizon, Sprint, AT&T, etc.) to users across a communications system. Users that access the IMS network to request an IMS service are assigned to one of a plurality of regional application servers or application server clusters (e.g., groups of application servers that serve the same cluster region) for supporting the requested IMS service.

Figure 6:
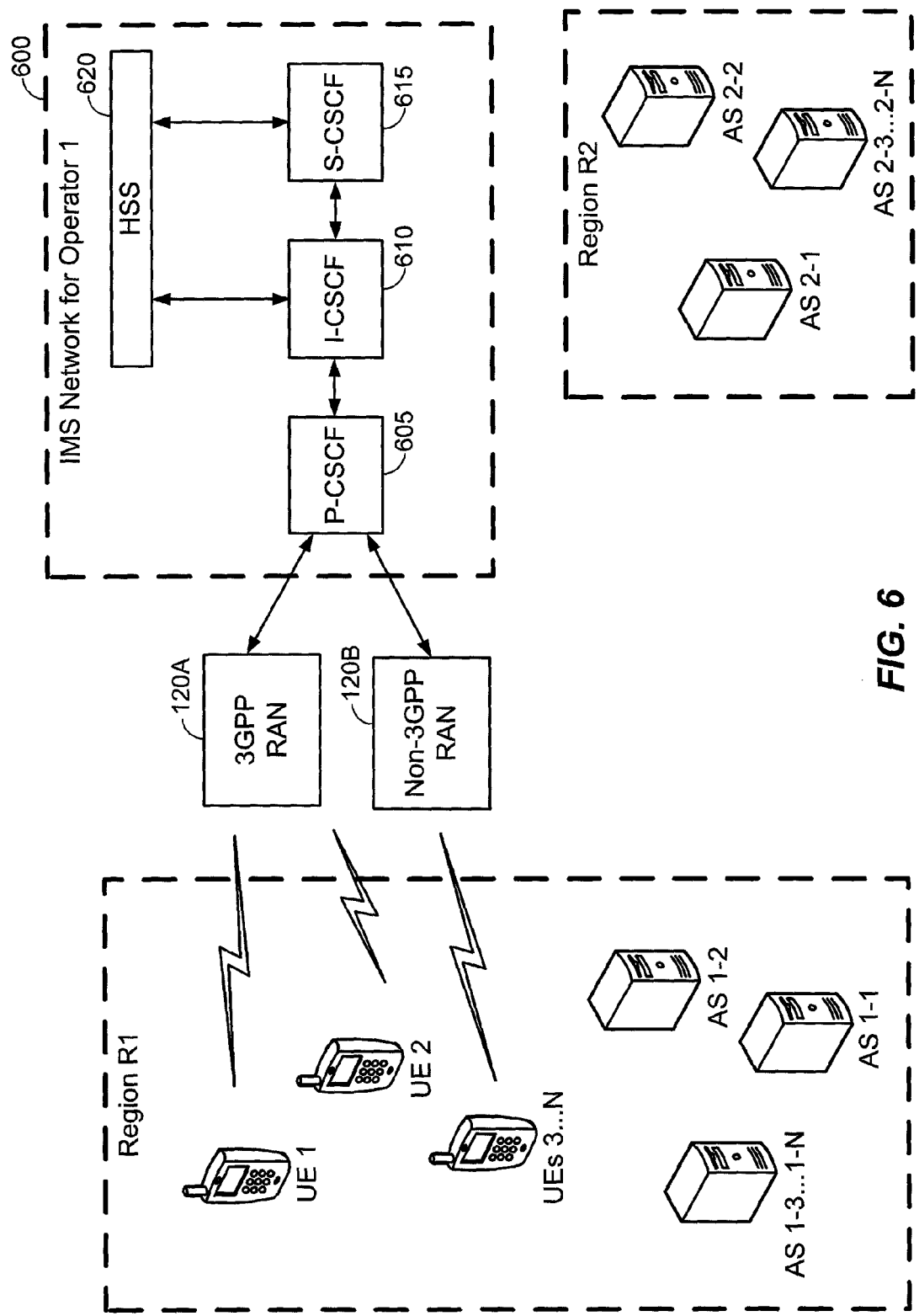
FIG. 6 illustrates an example of Internet Protocol (IP) multimedia subsystem (IMS) session architecture in accordance with an embodiment of the invention.

FIG. 6 illustrates an example of IMS architecture in accordance with an embodiment of the invention. Referring to FIG. 6, assume that a first cluster of application servers denoted as AS 1-1, AS 1-2 . . . AS 1-N is configured to provide IMS service to UEs and is located (or deployed) in a first region, and that a second cluster of application servers denoted as AS 2-1, AS 2-2 . . . AS 2-N is configured to provide IMS service to UEs is located (or deployed) in a second region. While not shown in FIG. 6 explicitly, other clusters of application servers can be deployed in other cluster regions as well. In FIG. 6, each cluster of application servers is assumed to be operated by the same operator (e.g., Sprint, Verizon, AT&T, etc.). In FIG. 6, UEs 1 . . . N are assumed to be operating in cluster region R1 and are configured to connect either to a 3GPP RAN 120A (e.g., any of RANs 120 from FIGS. 2A-2E) or a non-3GPP RAN 120B (e.g., a wired Ethernet connection, a WiFi connection such as AP 125, etc.). UEs 1 . . . N can then connect to an IMS network 600 through either the 3GPP RAN 120A or the non-3GPP RAN 120B.

Referring to FIG. 6, the IMS network 600 is shown as illustrating a particular set of IMS components, including a proxy call session control function (P-CSCF) 605, an interrogating CSCF (I-CSCF) 610, a serving CSCF (S-CSCF) 615 and a Home Subscriber Server (HSS) 620. The P-CSCF 605, I-CSCF 610 and S-CSCF 615 are sometimes referred to collectively as the CSCF, and the CSCF is responsible for signaling via Session Initiation Protocol (SIP) between the Transport Plane, Control Plane, and the Application Plane of the IMS network 600.

Referring to the P-CSCF 605 of FIG. 6, the P-CSCF 605 is responsible for interfacing directly with Transport Plane components and is the first point of signaling within the IMS network 600 for any end-point, such as UEs 1 . . . N. Once an endpoint acquires IP connectivity, the end point will cause a registration event to occur by first signaling to the P-CSCF 605. As the name implies, the P-CSCF 605 is a proxy for SIP messages from end-points to the rest of the IMS network 600. It is usually in a home network of the end point, but may reside in a visited network of the end point. The P-CSCF 605 will use a DNS look-up to identify a target I-CSCF 610 to send SIP messages, which could be an I-CSCF 610 in its own network or another I-CSCF across an administrative domain. The P-CSCF 605 can also be responsible for policy decisions (e.g., via an integrated or standalone Policy Decision Function (PDF) in Releases 5 or 6 of IMS, via a Policy Charging and Resource Function (PCRF) in Release 7 of IMS, etc.).

Referring to the I-CSCF 610 of FIG. 6, the main function of the I-CSCF 610 is to proxy between the P-CSCF 605 as entry point and S-CSCF 615 as control point for applications found in the Applications Plane. When the P-CSCF 605 receives a registration request SIP message, it will perform a DNS look-up to discover the appropriate I-CSCF 610 to route the message. Once the I-CSCF 610 receives the SIP message, it will perform a look-up operation with the HSS 620 via Diameter to determine the S-CSCF 615 that is associated with the end-point terminal. Once it receives this information, it will forward the SIP message to the appropriate S-CSCF 610 for further treatment.

Referring to the S-CSCF 615, the S-CSCF 615 is responsible for interfacing with the Application Servers (AS) (e.g., such as application servers 1-1, 1-2 . . . 1-N in cluster region R1, or application servers 2-1, 2-2 . . . 2-N in cluster region 2, and so on) in the Application Plane, Upon receiving a registration request SIP message from an I-CSCF 610, the S-CSCF 615 will query the HSS 622 via Diameter protocol to register the terminal as being currently served by itself. Subsequent session establishment requires knowing which S-CSCF 615 is responsible for the terminal session control. As part of the registration process, the S-CSCF 615 uses credentials it obtains from the query to the HSS 620 to issue an SIP message "challenge" back to the initiating P-CSCF 605 to authenticate the terminal.

In addition to acting as a registrar, the S-CSCF 615 is also responsible for routing SIP messages to the AS allowing for the Control Plane session control to interact with the Application Plane application logic. To do this, the S-CSCF 615 uses information obtained from the HSS 620 in the form of Initial Filter Criteria (IFC) that acts as triggers against inbound session establishment requests. The IFC includes rules that define how and where SIP messages should be routed to the various application servers that may reside in the Application Plane. The S-CSCF 615 may also act on Secondary Filter Criteria (SFC) obtained from the application servers during the course of messaging with them.

Referring to FIG. 6, a UE that requests IMS service (e.g., registration to set-up or join a VoIP session, a PTT session, a group communication session, etc.) from the IMS network 600 is assigned (or registered) to a target application server that is selected by the S-CSCF 615, as noted above. Generally, the IMS network 600 will attempt to select, as the target application server, an application server that is physically close to the UE and is also known to be capable of providing the requested IMS service.

In the current IMS standard, different UEs (e.g., a cell phone, a tablet computer, a desktop computer, etc.) can be registered to the same user for IMS service. However, in the current IMS standard, a UE that is registered to the same user as another UE does not necessarily have contact information for uniquely addressing the other UE.

An address-of-record (AOR) is a SIP uniform resource identifier (URI) that points to a domain with a location service that can map the URI to another URI where the user might be available. An AOR can be thought of as the public address of the user. SIP-based applications can require a user agent (UA) (e.g., a UA is configured to execute on a UE or client device, although it is possible for multiple UAs to be associated with the same client device) to construct and distribute a URI that can be used by anyone on the Internet to route a call to that specific UA instance, i.e., to that same physical device. A URI that routes to a specific UA instance is called a Globally Routable UA URI (GRUU) which has been specified by the Internet Engineering Task Force (IETF). A GRUU is a SIP URI that points to a specific device in the network and can be used globally to refer that device.

A GRUU is generated by SIP domains, for example by the S-CSCF 615 of the IMS network 600, and the GRUU is configured to route back to a SIP proxy (e.g., to the S-CSCF 610) in that domain. The domain in turn maintains the binding between the GRUU and the particular UA instance (i.e., the client device). The proxy receiving a GRUU can map the GRUU to the contact for the particular UA instance (i.e., the client device), and forward the request to the UA instance.

Generally, there are two types of GRUUs, referred to as public GRUUs (i.e., GRUUs which expose the underlying AOR) and temporary GRUUs (i.e., GRUUs which hide the underlying AOR). A public GRUU is constructed so that the mapping to the AOR is apparent. For example, many UAs retain call logs, which keep track of incoming and outgoing call attempts. If the UA has made a call to a GRUU (e.g. as a consequence of a transfer request), the call log can contain a GRUU. Since the call log is rendered to the user, it would be useful to be able to present the user with the AOR instead, since the AOR is meaningful to users as an identifier. A public GRUU is constructed by taking the AOR, and adding the "gr"

URI parameter with a value chosen by the registrar (e.g., the S-CSCF) in the domain. The value of the "gr" URI parameter contains a representation of the UA instance. For instance, if the AOR was "sip:alice@example.com", the public GRUU can be: sip:alice@example.com;gr=kjh29x97us97d. If a UA removes the "gr" URI parameter, the result is the AOR. Some systems can ignore unknown parameters, hence a public GRUU can "look" like the AOR to those systems.

Turning to temporary GRUUs, sometimes it is desirable to construct a GRUU that obfuscates the AOR such that it cannot be extracted by a recipient of the GRUU. A temporary GRUU can thereby protect the user's privacy. In such cases, the temporary GRUU can have any content provided that it meets the basic requirements of a GRUU, and the AOR cannot be readily determined from the temporary GRUU. The temporary GRUU can have the "gr" URI parameter, either with or without a value.

A UA can obtain a set of GRUUs (e.g., a public GRUU and a temporary GRUU) as part of a registration transaction. When doing so, the UA can obtain the set of GRUUs via a REGISTER request by providing an instance ID in the "+sip.instance" Contact header field parameter, defined by the IETF. The registrar (e.g., the S-CSCF 615) detects this header field parameter and provides the set of GRUUs to the UA in response to registration, e.g., in 200 OK SIP response. This process is shown below with respect to multiple devices registering with the IMS network 600 in association with the same user (i.e., the same instanceID in the sip.instance field of the SIP REGISTER message). Below, references are made to UEs and client devices instead of UAs, although it will be appreciated that each UE or client device referenced below is an example of a UA instance. Also, while the embodiments described below do not emphasize this aspect, multiple UAs can be assigned to the same client device or UE, and the embodiments of the invention described below can also be directed towards client devices to which multiple UAs are registered as well.

Figure 7:
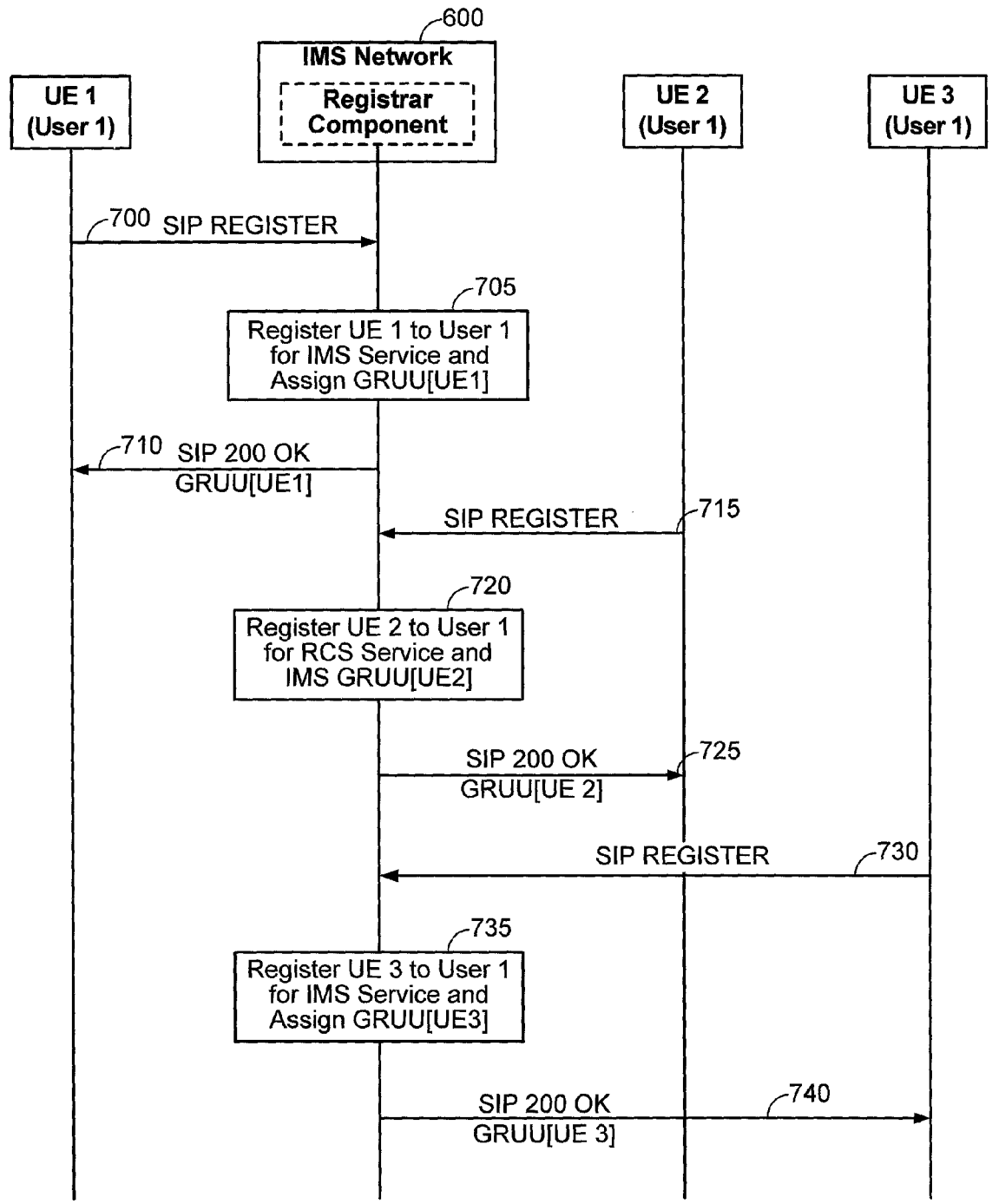
FIG. 7 illustrates a conventional IMS service registration procedure that registers multiple client devices to the same user.

FIG. 7 illustrates a conventional IMS service registration procedure that registers multiple client devices to the same user. Referring to FIG. 7, assume that UE 1 is operated by a first user, and that UE 1 transmits a SIP REGISTER message to a registrar component (e.g., S-CSCF 615) of the IMS network 600 to request registration to an IMS service, 700. For example, for a user named "Kate" with a contact address of "kate@example.com" and a sip.instance of "instanceID", the SIP REGISTER message of 700 can be configured as follows:

TABLE 2

| Message: | SIP REGISTER |
|---|---|
| Supported | GRUU |
| Contact: | kate@example.com;+sip.instance="instanceID" |

The a registrar component of the IMS network 600 registers UE 1 to user 1 and assigns a set of GRUUs ("GRUU[UE1]") to UE 1, 705. The registrar component of the IMS network 700 then notifies UE 1 of the assignment via a SIP 200 OK message, 710, which can be configured as shown below in Table 3:

TABLE 3

| Message: | SIP 200 OK |
|---|---|
| Contact: | kate@example.com;+sip.instance="instanceID1" |
| GRUU[UE1] | Public GRUU = "abcd123" |
| | Temporary GRUU = "edfge456" |

At some later point in time, UE 2 is also operated by the first user (e.g., Kate) and UE 2 transmits a SIP REGISTER message to the registrar component (e.g., S-CSCF 615, although the S-CSCF 615 for UE 2 does not necessarily need to be the same S-CSCF 615 that is serving UE 1) of the IMS network 600 to request registration to an IMS service, 715. For example, if the first user is "Kate" with a contact address of "kate@example.com" and a sip:instance of "instanceID", the SIP REGISTER message of 715 can be configured as shown above in Table 2. The registrar component of the IMS network 600 registers UE 2 to user 1 and assigns a set of GRUUs ("GRUU[UE2]") to UE 2, 720. The registrar component of the IMS network 600 then notifies UE 2 of the assignment via a SIP 200 OK message, 725, which can be configured as shown below in Table 4:

TABLE 4

| Message: | SIP 200 OK |
|---|---|
| Contact: | kate@example.com;+sip.instance="instanceID2" |
| GRUU[UE2] | Public GRUU = "lkjh877" |
| | Temporary GRUU = "apoi678" |

At some later point in time, UE 3 is also operated by the first user (e.g., Kate) and UE 3 transmits a SIP REGISTER message to the registrar component (e.g., S-CSCF 615, although the S-CSCF 615 for UE 3 does not necessarily need to be the same S-CSCF 615 that is serving UE 1 or UE 2) of the IMS network 600 to request registration to an IMS service, 730. For example, if the first user is "Kate" with a contact address of "kate@example.com" and a sip.instance of "instanceID", the SIP REGISTER message of 730 can be configured as shown above in Table 2. The registrar component of the IMS network 600 registers UE 3 to user 3 and assigns a set of GRUUs ("GRUU[UE3]") to UE 2, 735. The registrar component of the IMS network 600 then notifies UE 3 of the assignment via a SIP 200 OK message, 740, which can be configured as shown below in Table 5:

TABLE 5

| Message: | SIP 200 OK |
|---|---|
| Contact: | kate@example.com;+sip.instance="instanceID3" |
| GRUU[UE3] | Public GRUU = "poiu979" |
| | Temporary GRUU = "qpza555" |

Accordingly, after the process of FIG. 7 is completed, UEs 1, 2 and 3 are aware of their own respective GRUUs, but UEs 1, 2 and 3 are not aware of the GRUUs for any of the other UEs associated with the first user. In certain scenarios, it can be beneficial for different UEs that register to the IMS service to be aware of GRUUs for other UEs that are also registered to the IMS service in association with the same user (or the same primary identity). Thereby, at least one embodiment of the invention is directed to updating a target client device with contact information (e.g., GRUUs) for one or more other client devices registered to the same user for an IMS service.

Figure 8:
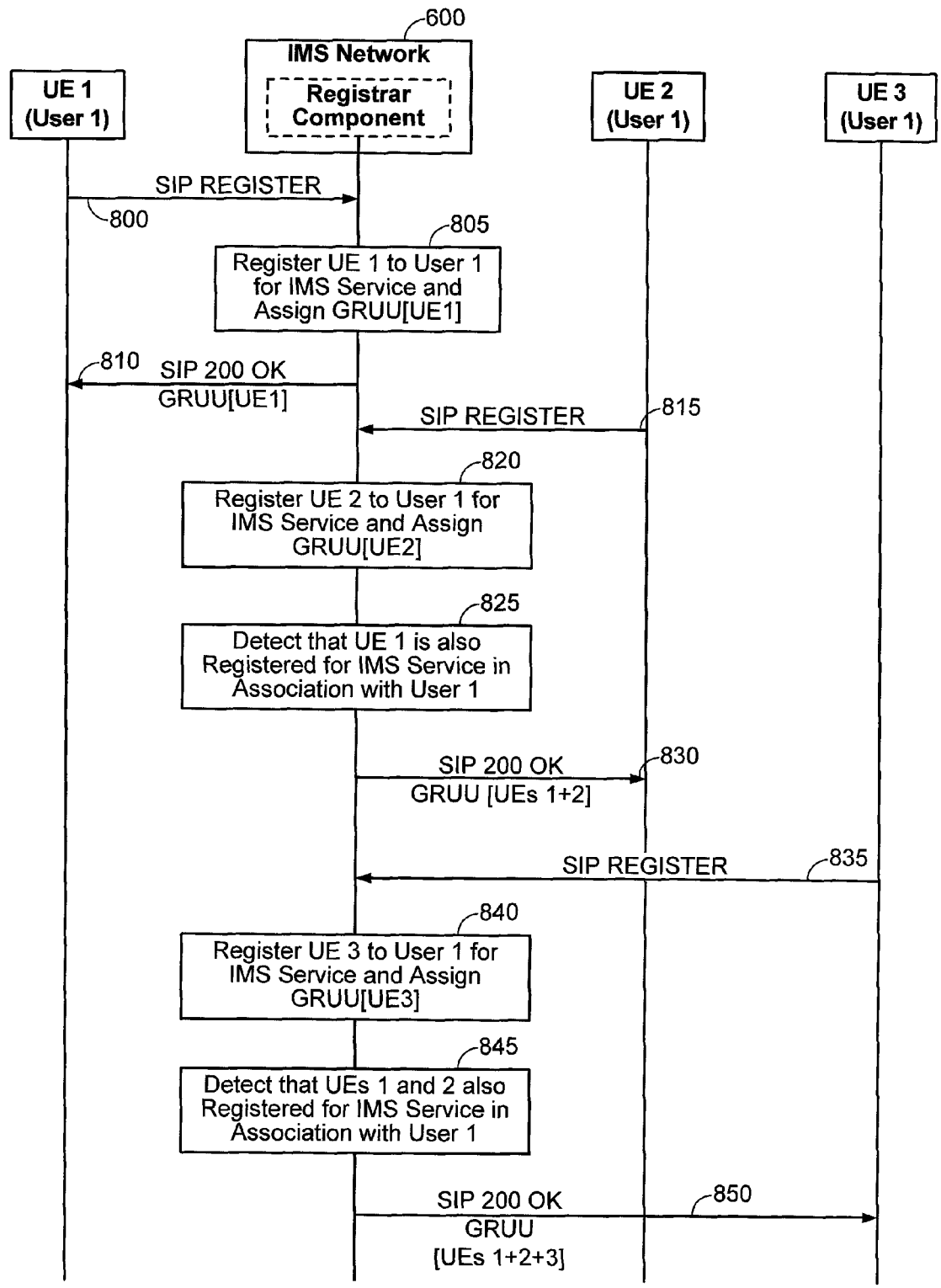
FIG. 8 illustrates an IMS service registration procedure that registers multiple client devices to the same user in accordance with an embodiment of the invention.

FIG. 8 illustrates an IMS service registration procedure that registers multiple client devices to the same user in accordance with an embodiment of the invention. Referring to FIG. 8, assume that UE 1 is operated by a first user, and that UE 1 is the first UE (or UA) to request registration with the IMS service for the first user. Under these assumptions, UE 1 transmits a SIP REGISTER message to the registrar component (e.g., S-CSCF 615) of the IMS network 600 to request registration to an IMS service, 800. For example, for a user named "Kate" with a contact address of "kate@example.com" and a sip.instance of "instanceID", the SIP REGISTER message of 800 can be configured as discussed above with respect to Table 2. The registrar component of the IMS network 600 registers UE 1 to user 1 and assigns a set of GRUUs ("GRUU[UE1]") to UE 1, 805. The registrar component of the IMS network 600 then notifies UE 1 of the assignment via a SIP 200 OK message, 810, which can be configured as shown above with respect to Table 3.

At some later point in time, UE 2 is also operated by the first user (e.g., Kate) and UE 2 transmits a SIP REGISTER message to the registrar component (e.g., S-CSCF 615, although the S-CSCF 615 for UE 2 does not necessarily need to be the same S-CSCF 615 that is serving UE 1) of the IMS network 600 to request registration to an IMS service, 815. For example, if the first user is "Kate" with a contact address of "kate@example.com" and a sip.instance of "instanceID", the SIP REGISTER message of 815 can be configured as shown above in Table 2. The registrar component of the IMS network 600 registers UE 2 to user 1 and assigns a set of GRUUs ("GRUU[UE2]") to UE 2, 820 (e.g., similar to 720 of FIG. 7). However, in the embodiment of FIG. 8, the registrar component of the IMS network 600 also detects that user 1 has another client device that has already registered for IMS service, i.e., UE 1. This detection can be based on a table that is maintained by the registrar component of the IMS network 600 which tracks information (e.g., GRUUs, Rich Communications Suite (RCS) capability information, etc.) of each client device registered to the same user. At 830, in response to the detection from 825, the registrar component of the IMS network 600 configures a SIP 200 OK message that indicates both GRUU[UE1] and GRUU[UE2] and sends the SIP 200 OK message to UE 2, which can be configured as shown below in Table 6:

TABLE 6

| Message: | SIP 200 OK |
|---|---|
| Contact: | kate@example.com;+sip.instance="instanceID2" |
| GRUU[UE1] | Public GRUU = "abcd123" |
| | Temporary GRUU = "edfge456" |
| GRUU[UE2] | Public GRUU = "lkjh877" |
| | Temporary GRUU = "apoi678" |

At some later point in time, UE 3 is also operated by the first user (e.g., Kate) and UE 3 transmits a SIP REGISTER message to the registrar component (e.g., S-CSCF 615, although the S-CSCF 615 for UE 3 does not necessarily need to be the same S-CSCF 615 that is serving UE 1 or UE 2) of the IMS network 600 to request registration to an IMS service, 835. For example, if the first user is "Kate" with a contact address of "kate@example.com" and a sip.instance of "instanceID", the SIP REGISTER message of 830 can be configured as shown above in Table 2. The registrar component of the IMS network 600 registers UE 3 to user 1 and assigns a set of GRUUs ("GRUU[UE3]") to UE 3, 840 (e.g., similar to 735 of FIG. 7). However, in the embodiment of FIG. 8, the registrar component of the IMS network 600 also detects that user 1 has other client devices that have already registered for IMS service, i.e., UEs 1 and 2. This detection can be based on a table that is maintained by the registrar component of the IMS network 600 which tracks information (e.g., GRUUs, RCS capability information, etc.) of each client device registered to the same user, similar to 825. At 850, in response to the detection of 845, the registrar component of the IMS network 600 configures a SIP 200 OK message that indicates GRUU[UE1], GRUU[UE2] and GRUU[UE2] and sends the SIP 200 OK message to UE 3, which can be configured as shown below in Table 7:

TABLE 7

| Message: | SIP 200 OK |
|---|---|
| Contact: | kate@example.com;+sip.instance="instanceID2" |
| GRUU[UE1] | Public GRUU = "abcd123" |
| | Temporary GRUU = "edfge456" |
| GRUU[UE2] | Public GRUU = "lkjh877" |
| | Temporary GRUU = "apoi678" |
| GRUU[UE3] | Public GRUU = "poiu979" |
| | Temporary GRUU = "qpza555" |

In the embodiment of FIG. 8, each UE that registers with the registrar component of the IMS network 600 obtains up-to-date GRUU information for each UE that is registered with the registrar component of the IMS network 600 in association with the first user. By contrast, in FIG. 7, each UE only receives its own GRUU information in conjunction with registration.

Figure 9:
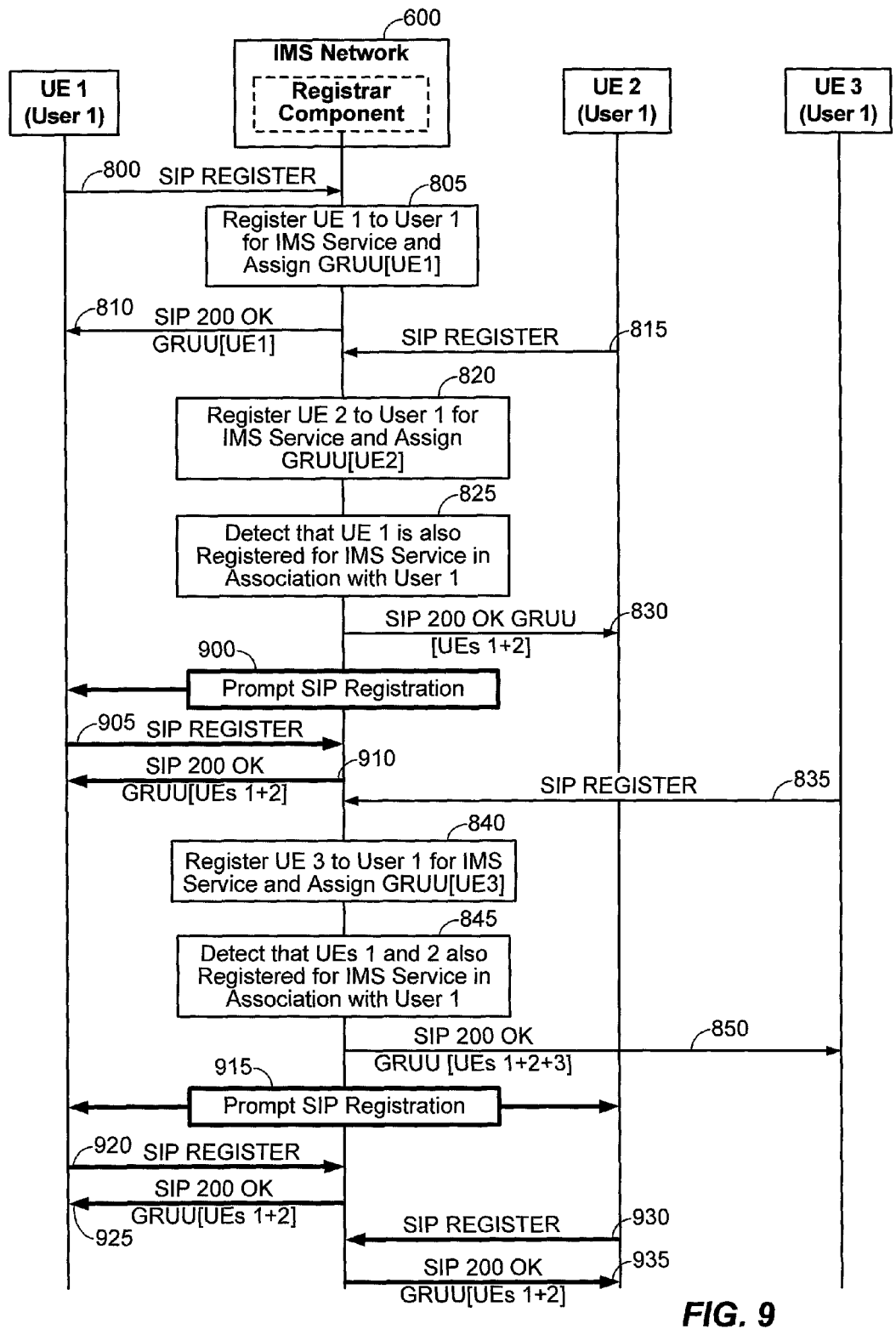
FIG. 9 illustrates an alternative implementation of the process of FIG. 8 in accordance with an embodiment of the invention.
Figure 10:
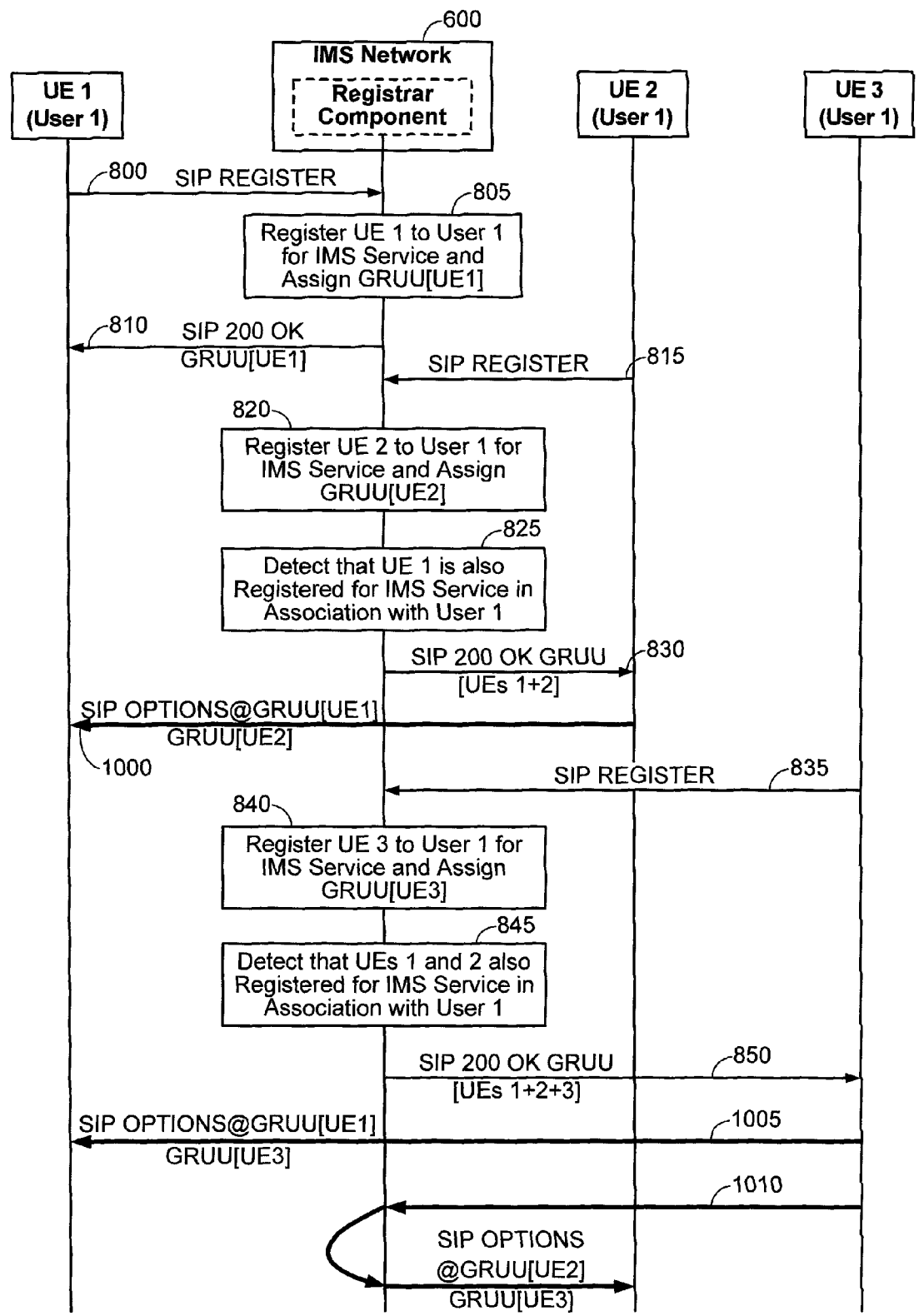
FIG. 10 illustrates another alternative implementation of the process of FIG. 8 in accordance with an embodiment of the invention.

It will be appreciated from a review of FIG. 8 that earlier registering UEs do not necessarily obtain the GRUU information for later registering UEs. For example, UE 2 is notified of GRUU[UE1] while UE 1 is not notified of GRUU[UE2], and UE 3 is notified of both GRUU[UE1] and GRUU[UE2] while UEs 1 and 2 are not notified of GRUU[UE3]. FIGS. 9 and 10 provide two different implementations through which earlier registering UEs can be updated with respect to the GRUU information of later registering UEs.

Referring to FIG. 9, 800 through 850 are executed as discussed above with respect to FIG. 8. However, in FIG. 9, in addition to the execution of 800 through 850, each time the registrar component of the IMS network 600 registers a new UE to the IMS service in association with a user to which at least one UE has already registered, the registrar component of the IMS network 600 will initiate a SIP registration procedure that functions to update the GRUU information stored on the earlier registering UE(s).

In particular, in response to the detection of 825, the registrar component of the IMS network 600 sends a signal to UE 1 to prompt UE 1 to perform a SIP registration procedure, 900. In response to the signaling of 900 from the registrar component of the IMS network 600, UE 1 transmits a SIP REGISTER message to the registrar component of the IMS network 600 to renew its registration to the IMS service, 905. In an example, the SIP REGISTER message of 905 can be configured as discussed above with respect to Table 2. The registrar component of the IMS network 600 optionally renews UE 1's registration to the IMS service and transmits a SIP 200 OK message to UE 1 that indicates both GRUU[UE1] and GRUU[UE2], 910. In an example, the SIP OK message can be configured as shown above with respect to Table 6. Thereby, each earlier registering UE associated with the first user can be prompted to renew its registration, and thereby obtain updated GRUU information for the later registering UE(s), whenever a new UE registers for IMS service in association with the first user.

Later, in response to the detection of 845, the registrar component of the IMS network 600 sends a signal to both UEs 1 and 2 to prompt UEs 1 and 2 to perform SIP registration procedures, 915. In response to the signaling of 915 from the registrar component of the IMS network 600, UE 1 transmits a SIP REGISTER message to the registrar component of the IMS network 600 to renew its registration to the IMS service, 920, after which the registrar component of the IMS network 600 optionally renews UE 1's registration to the IMS service and transmits a SIP 200 OK message to UE 1 that indicates GRUU[UE1], GRUU[UE2] and GRUU[UE3], 925. Similarly, in response to the signaling of 915 from the registrar component of the IMS network 600, UE 2 transmits a SIP REGISTER message to the registrar component of the IMS network 600 to renew its registration to the IMS service, 930, after which the registrar component of the IMS network 600 optionally renews UE 2's registration to the MS service and transmits a SIP 200 OK message to UE 2 that indicates GRUU[UE1], GRUU[UE2] and GRUU[UE3], 935. Thereby, each earlier registering UE associated with the first user can be prompted to renew its registration, and thereby obtain updated GRUU information for the later registering UE(s), whenever a new UE registers for IMS service in association with the first user.

Referring to FIG. 10, 800 through 850 are executed as discussed above with respect to FIG. 8. However, in FIG. 10, in addition to the execution of 800 through 850, each time a new UE is registered to the IMS service in association with a user to which at least one other UE has already registered, newly registered will "push" some or all of the GRUU information to the earlier registering UE(s). Thus, FIG. 9 is directed to a server-initiated GRUU update operation for conveying new GRUU information to the earlier registering UEs, while FIG. 10 is directed to a UE-initiated update operation for conveying new GRUU information to the earlier registering UEs.

In particular, after UE 2 receives the SIP 200 OK message at 830, UE 2 detects that GRUU information was received for at least one UE (i.e., UE 1) in addition to UE 2. Based on this detection, UE 2 transmits a SIP OPTIONS message to UE 1 via the IMS network 600 that is addressed to GRUU[UE1] and includes an indication of GRUU[UE2], 1000. While not shown in FIG. 10, the SIP OPTIONS message may further include RCS capability information for UE 2. Also, while not shown in FIG. 10, UE 1 may respond to the SIP OPTIONS message with a SIP 200 OK message that is addressed to GRUU[UE2] and which indicates UE 1's own RCS capability information.

Later, after UE 3 receives the SIP 200 OK message at 850, UE 3 detects that GRUU information was received for at least one UE (i.e., UEs 1 and 2) in addition to UE 3. Based on this detection, UE 3 transmits SIP OPTIONS messages to UEs 1 and 2 via the IMS network 600 that are addressed to GRUU [UE1] and GRUU[UE2], respectively, 1005 and 1010. In particular, the SIP OPTIONS messages sent to UEs 1 and 2 at 1005 and 1010 each include an indication of at least GRUU [UE3].

In a further example, the SIP OPTIONS messages sent to UEs 1 and 2 at 1005 and 1010 can further include an indication of GRUU information in addition to GRUU[UE3] as well. For example, the SIP OPTIONS message of 1005 can indicate both GRUU[UE2] and GRUU[UE3], and the SIP OPTIONS message of 1010 can indicate both GRUU[UE1] and GRUU[UE3]. Expanding on this example, an order in which the UEs associated with the first user have registered for IMS service can be conveyed in the SIP 200 OK message of 830 and/or 850. For example, each UE can be associated with a ranking of 1, 2, 3, etc., where an earlier ranking implies earlier IMS registration. In another example, an explicit time (e.g., 7:03:06.02) at which each other UE registered to the IMS service can be added to the respective SIP 200 OK messages. In any case, when UE 3 is aware of the IMS registration order, UE 3 will know that UE 1 registered before UE 2, so UE 2 can infer that UE 3 knows GRUU[UE1] and GRUU[UE2] while UE 1 may only know GRUU[UE1] (e.g., if UE 2 did not initiate the push operation of 1000, UE 1 would not know GRUU[UE2] so UE 3 cannot always assume that UE 1 already knows GRUU[UE2]). In this case, the SIP OPTIONS message of 1005 can include both GRUU[UE2] and GRUU[UE3] while the SIP OPTIONS message of 1010 only includes GRUU[UE3] because UE 2 is expected to already know GRUU[UE1] based on its later registration.

While not shown in FIG. 10, the SIP OPTIONS messages of 1005 and/or 1010 may further include RCS capability information for UE 3. Also, while not shown in FIG. 10, UE 1 and UE 2 may respond to the SIP OPTIONS messages with SIP 200 OK messages that are addressed to GRUU[UE3] and which indicates the RCS capability information of UEs 1 and 2, respectively.

Further, with respect to FIGS. 8-10, the registration functions of the IMS network 600 of the IMS network 600 are described as being performed by a single registrar component, although it is understood that the "single registrar component" can refer to disparate devices that collectively perform the above-noted registration functions. For example, the IMS network 600 includes multiple S-CSCFs 615, and the "single registrar component" could theoretically read upon different S-CSCFs for different of the UEs based on where the respective UEs are located. However, even if the single registrar component is inclusive of disparate devices (e.g., S-CSCFs 615) distributed throughout the IMS network 600, each portion of the single registrar component must be part of the IMS network 600, and would not include external components such as the application servers in regions R1 and/or R2 from FIG. 6 for instance. Of course, the single registrar component could also correspond to a single device, such as a single S-CSCF 615 that serves each of UEs 1 . . . 3 in FIGS. 8-10. Further, if the single registrar component comprises multiple S-CSCFs 615 (e.g., one device connects through a 3G access network and another device via WiFi such that the 3G-connected and the WiFi-connected device are assigned to different S-CSCFs 615, etc.), the respective GRUU information for devices being served by the multiple S-CSCFs can be stored in a commonly accessible database such as the HSS 620 or a subscription profile repository (SPR) (not shown) to which the multiple S-CSCFs 615 can each interface.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a single registrar component of an Internet Protocol (IP) Multimedia Subsystem (IMS) network, comprising:
   receiving a first request to register a first client device associated with a given user to an IMS service;
   registering the first client device to the IMS service with a first set of device-specific routing identifiers;
   transmitting, from the single registrar component to the first client device, a first acknowledgment to the first request that indicates that the first client device is registered to the IMS service with the first set of device-specific routing identifiers;
   receiving a second request to register a second client device associated with the given user to the IMS service;
   registering the second client device to the IMS service with a second set of device-specific routing identifiers;
   transmitting, from the single registrar component to the second client device, a second acknowledgment to the second request that indicates that the second client device is registered to the IMS service with the second set of device-specific routing identifiers,
   wherein the second acknowledgment further includes an indication of the first set of device-specific routing identifiers registered to the first client device;
   transmitting, in response to the second request, a message to the first client device that is configured to prompt the first client device to perform another registration procedure;
   receiving a third request to register the first client device associated with the given user to the IMS service; and
   transmitting, from the single registrar component to the first client device, a third acknowledgment to the third request that indicates the second set of device-specific routing identifiers for the second client device.

2. The method of claim 1, wherein the first and second sets of device-specific routing identifiers correspond to first and second sets of Globally Routable User Agent Uniform Resource Identifiers (GRUUs).

3. The method of claim 2, wherein each of the first and second sets of GRUUs include a public GRUU and a temporary GRUU.

4. The method of claim 1,
   wherein the first request is a first Session Initiation Protocol (SIP) REGISTER message,
   wherein the first acknowledgment is a first SIP 200 OK message,
   wherein the second request is a second SIP REGISTER message, and
   wherein the second acknowledgment is a second SIP 200 OK message.

5. The method of claim 1, further comprising:
   receiving a fourth request to register a third client device associated with the given user to the IMS service;
   registering the third client device to the IMS service with a third set of device-specific routing identifiers; and
   transmitting, from the single registrar component to the third client device, a fourth acknowledgment to the fourth request that indicates that the third client device is registered to the IMS service with the third set of device-specific routing identifiers,
   wherein the fourth acknowledgment further includes an indication of both the first and second sets of device-specific routing identifiers registered to the first and second client devices, respectively.

6. The method of claim 1, wherein the single registrar component is a Serving Call Session Control Function (S-CSCF) of the IMS network.

7. The method of claim 1, wherein the single registrar component is two or more disparate Serving Call Session Control Functions (S-CSCFs) of the IMS network.

8. The method of claim 1, wherein the first acknowledgment further indicates at least one other set of device-specific routing identifiers for at least one other UE that has previously registered to the IMS service in association with the given user.

9. The method of claim 8, wherein the second acknowledgment also further indicates the at least one other set of device-specific routing identifiers.

10. A method of operating a client device associated with a user, comprising:
  transmitting, to a single registrar component of an Internet Protocol (IP) Multimedia Subsystem (IMS) network, a request to register the client device to an IMS service;
  receiving, from the single registrar component in response to the transmitted request, a notification that the client device is registered to the IMS service with a first set of device-specific routing identifiers,
  wherein the notification further includes an indication of at least one additional set of device-specific routing identifiers for at least one other client device that previously registered for the IMS service in association with the user;
  receiving, from the single registrar component in response to registration of at least one client device for the IMS service in association with the user after the notification was received by the client device, a message that is configured to prompt the client device to perform another registration procedure;
  transmitting a supplemental registration request to the single registrar component in response to the message; and
  receiving, from the single registrar component in response to the supplemental registration request, a supplemental notification that indicates at least one new set of device-specific routing identifiers for the at least one client device.

11. The method of claim 10, wherein the first and at least one additional sets of device-specific routing identifiers each correspond to a set of Globally Routable User Agent Uniform Resource Identifiers (GRUUs).

12. The method of claim 11, wherein each set of GRUUs includes a public GRUU and a temporary GRUU.

13. The method of claim 10,
  wherein the request is a Session Initiation Protocol (SIP) REGISTER message, and
  wherein the notification is a SIP 200 OK message.

14. The method of claim 10, wherein the single registrar component is a Serving Call Session Control Function (S-CSCF) of the IMS network.

15. The method of claim 10, further comprising:
  configuring, in response to the notification, at least one peer notification message that is addressed to the at least one additional set of device-specific routing identifiers and which indicates the first set of device-specific routing identifiers of the client device; and
  transmitting the at least one peer notification message to the IMS network for delivery to the at least one other client device in order to notify the at least one other client device of the first set of device-specific routing identifiers.

16. The method of claim 15, wherein the at least one peer notification message corresponds to at least one Session Initiation Protocol (SIP) OPTIONS message.

17. A single registrar component of an Internet Protocol (IP) Multimedia Subsystem (IMS) network, comprising:
  means for receiving a first request to register a first client device associated with a given user to an IMS service;
  means for registering the first client device to the IMS service with a first set of device-specific routing identifiers;
  means for transmitting, from the single registrar component to the first client device, a first acknowledgment to the first request that indicates that the first client device is registered to the IMS service with the first set of device-specific routing identifiers;
  means for receiving a second request to register a second client device associated with the given user to the IMS service;
  means for registering the second client device to the IMS service with a second set of device-specific routing identifiers;
  means for transmitting, from the single registrar component to the second client device, a second acknowledgment to the second request that indicates that the second client device is registered to the IMS service with the second set of device-specific routing identifiers,
  wherein the second acknowledgment further includes an indication of the first set of device-specific routing identifiers registered to the first client device;
  means for transmitting, in response to the second request, a message to the first client device that is configured to prompt the first client device to perform another registration procedure;
  means for receiving a third request to register the first client device associated with the given user to the IMS service; and
  means for transmitting, from the single registrar component to the first client device, a third acknowledgment to the third request that indicates the second set of device-specific routing identifiers for the second client device.

18. A client device associated with a user, comprising:
  means for transmitting, to a single registrar component of an Internet Protocol (IP) Multimedia Subsystem (IMS) network, a request to register the client device to an IMS service;
  means for receiving, from the single registrar component in response to the transmitted request, a notification that the client device is registered to the IMS service with a first set of device-specific routing identifiers,
  wherein the notification further includes an indication of at least one additional set of device-specific routing identifiers for at least one other client device that previously registered for the IMS service in association with the user;
  means for receiving, from the single registrar component in response to registration of at least one client device for the IMS service in association with the user after the notification was received by the client device, a message that is configured to prompt the client device to perform another registration procedure;
  means for transmitting a supplemental registration request to the single registrar component in response to the message; and
  means for receiving, from the single registrar component in response to the supplemental registration request, a supplemental notification that indicates at least one new set of device-specific routing identifiers for the at least one client device.

19. A single registrar component of an Internet Protocol (IP) Multimedia Subsystem (IMS) network, comprising:
   logic configured to receive a first request to register a first client device associated with a given user to an IMS service;
   logic configured to register the first client device to the IMS service with a first set of device-specific routing identifiers;
   logic configured to transmit, from the single registrar component to the first client device, a first acknowledgment to the first request that indicates that the first client device is registered to the IMS service with the first set of device-specific routing identifiers;
   logic configured to receive a second request to register a second client device associated with the given user to the IMS service;
   logic configured to register the second client device to the IMS service with a second set of device-specific routing identifiers;
   logic configured to transmit, from the single registrar component to the second client device, a second acknowledgment to the second request that indicates that the second client device is registered to the IMS service with the second set of device-specific routing identifiers,
   wherein the second acknowledgment further includes an indication of the first set of device-specific routing identifiers registered to the first client device;
   logic configured to transmit, in response to the second request, a message to the first client device that is configured to prompt the first client device to perform another registration procedure;
   logic configured to receive a third request to register the first client device associated with the given user to the IMS service; and
   logic configured to transmit, from the single registrar component to the first client device, a third acknowledgment to the third request that indicates the second set of device-specific routing identifiers for the second client device.

20. A client device associated with a user, comprising:
   logic configured to transmit, to a single registrar component of an Internet Protocol (IP) Multimedia Subsystem (IMS) network, a request to register the client device to an IMS service;
   logic configured to receive, from the single registrar component in response to the transmitted request, a notification that the client device is registered to the IMS service with a first set of device-specific routing identifiers,
   wherein the notification further includes an indication of at least one additional set of device-specific routing identifiers for at least one other client device that previously registered for the IMS service in association with the user;
   logic configured to receive, from the single registrar component in response to registration of at least one client device for the IMS service in association with the user after the notification was received by the client device, a message that is configured to prompt the client device to perform another registration procedure;
   logic configured to transmit a supplemental registration request to the single registrar component in response to the message; and
   logic configured to receive, from the single registrar component in response to the supplemental registration request, a supplemental notification that indicates at least one new set of device-specific routing identifiers for the at least one client device.

21. A non-transitory computer-readable medium containing instructions stored thereon, which, when executed by a single registrar component of an Internet Protocol (IP) Multimedia Subsystem (IMS) network, cause the single registrar component to perform operations, the instructions comprising:
   at least one instruction configured to cause the single registrar component to receive a first request to register a first client device associated with a given user to an IMS service;
   at least one instruction configured to cause the single registrar component to register the first client device to the IMS service with a first set of device-specific routing identifiers;
   at least one instruction configured to cause the single registrar component to transmit, from the single registrar component to the first client device, a first acknowledgment to the first request that indicates that the first client device is registered to the IMS service with the first set of device-specific routing identifiers;
   at least one instruction configured to cause the single registrar component to receive a second request to register a second client device associated with the given user to the IMS service;
   at least one instruction configured to cause the single registrar component to register the second client device to the IMS service with a second set of device-specific routing identifiers;
   at least one instruction configured to cause the single registrar component to transmit, from the single registrar component to the second client device, a second acknowledgment to the second request that indicates that the second client device is registered to the IMS service with the second set of device-specific routing identifiers,
   wherein the second acknowledgment further includes an indication of the first set of device-specific routing identifiers registered to the first client device;
   at least one instruction configured to cause the single registrar component to transmit, in response to the second request, a message to the first client device that is configured to prompt the first client device to perform another registration procedure;
   at least one instruction configured to cause the single registrar component to receive a third request to register the first client device associated with the given user to the IMS service; and
   at least one instruction configured to cause the single registrar component to transmit, from the single registrar component to the first client device, a third acknowledgment to the third request that indicates the second set of device-specific routing identifiers for the second client device.

22. A non-transitory computer-readable medium containing instructions stored thereon, which, when executed by a client device associated with a user, cause the client device to perform operations, the instructions comprising:
   at least one instruction configured to cause the client device to transmit, to a single registrar component of an Internet Protocol (IP) Multimedia Subsystem (IMS) network, a request to register the client device to an IMS service;
   at least one instruction configured to cause the client device to receive, from the single registrar component in response to the transmitted request, a notification that the client device is registered to the IMS service with a first set of device-specific routing identifiers,
wherein the notification further includes an indication of at least one additional set of device-specific routing identifiers for at least one other client device that previously registered for the IMS service in association with the user;
at least one instruction configured to cause the client device to receive, from the single registrar component in response to registration of at least one client device for the IMS service in association with the user after the notification was received by the client device, a message that is configured to prompt the client device to perform another registration procedure;
at least one instruction configured to cause the client device to transmit a supplemental registration request to the single registrar component in response to the message; and
at least one instruction configured to cause the client device to receive, from the single registrar component in response to the supplemental registration request, a supplemental notification that indicates at least one new set of device-specific routing identifiers for the at least one client device.

* * * * *